(12) United States Patent
Gulbay et al.

(10) Patent No.: US 10,277,291 B2
(45) Date of Patent: Apr. 30, 2019

(54) SIMULTANEOUS ANTENNA UTILIZATION IN MU-MIMO MODE

(71) Applicant: Dell Products L.P., Round Rock, TX (US)

(72) Inventors: Sinem Gulbay, Austin, TX (US); Kamal Joseph Koshy, Austin, TX (US); Andrew Thomas Sultenfuss, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 119 days.

(21) Appl. No.: 15/640,434

(22) Filed: Jun. 30, 2017

(65) Prior Publication Data

US 2019/0007110 A1    Jan. 3, 2019

(51) Int. Cl.
*H04B 7/06* (2006.01)
*H04B 7/0452* (2017.01)
*H04B 7/08* (2006.01)

(52) U.S. Cl.
CPC ......... *H04B 7/0452* (2013.01); *H04B 7/0678* (2013.01); *H04B 7/0842* (2013.01)

(58) Field of Classification Search
CPC .. H04B 7/0413; H04B 7/0452; H04B 7/0613; H04B 7/0686; H04B 7/0689

USPC ................................................. 375/267, 299
See application file for complete search history.

(56) References Cited

U.S. PATENT DOCUMENTS

| | | | | |
|---|---|---|---|---|
| 2015/0036766 A1* | 2/2015 | Elsayed | ................. | H03M 3/02 375/297 |
| 2017/0201008 A1* | 7/2017 | Wu | ...................... | H01Q 1/2291 |
| 2017/0358843 A1* | 12/2017 | Huang | ................. | H04B 7/0817 |
| 2018/0248811 A1* | 8/2018 | Di Nallo | ........... | H04W 72/0446 |
| 2018/0331714 A1* | 11/2018 | See | ........................... | H04B 1/44 |

* cited by examiner

*Primary Examiner* — Kevin Kim
(74) *Attorney, Agent, or Firm* — Norton Rose Fulbright US LLP

(57) ABSTRACT

A MIMO-enabled information handling system may have multiple antennas configured to transmit multiple spatial streams. In some modes, all antennas may be used such as during SU-MIMO communications. In other modes, less than all antennas may be used such as during MU-MIMO communications. When unused MIMO antennas are available during MU-MIMO mode, the elements may be reused for transmitting data for other wireless technologies or spectrums. For example, while transmitting MU-MIMO Wi-Fi data through one spatial stream, Bluetooth data may be simultaneously transmitted through one of the unused Wi-Fi MIMO antennas.

20 Claims, 8 Drawing Sheets

SIMULTANEOUS ANTENNA UTILIZATION IN MU-MIMO MODE

FIELD OF THE DISCLOSURE

The instant disclosure relates to wireless communications. More specifically, portions of this disclosure relate to antenna usage during wireless communications.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some of the hardware and software components of the information handling system may be directed to communicating information over one or more wireless networks. FIG. 1 is a diagram illustrating of information handling systems communicating according to the prior art. An information handling system 110 may include a plurality of antennas for communicating with access point 140 to communicate to the Internet 150, for communicating with another information handling system 130, and/or for communicating to nearby device 120 such as a wireless speaker. Each of these different communications may involve different wireless technologies, such as Wi-Fi, Bluetooth, 3G cellular, and 4G cellular. In one conventional solution, a separate dedicated antenna would be used for each wireless technology. However, the space available for multiple dedicated antennas is decreasing in smaller devices, and additional dedicated antennas add to the cost of the device.

SUMMARY

Some wireless technologies may implement multiple-input and multiple-output (MIMO) wireless technology to increase the capacity of a radio link using multiple transmit and receive antennas. Many wireless technologies may be enabled for MIMO operation, such as 802.11 Wi-Fi standards, HSPA+(3G), WiMAX (4G), and Long Term Evolution (4G). MIMO technology employs multiple antennas at both the transmitter and the receiver to send and receive multiple data signals on the same radio channel at the same time via multipath propagation. An information handling system implementing MIMO with a wireless technology may include two or more antennas co-located within the information handling system.

MIMO antennas may be operated in a single spatial stream mode or a multi-spatial stream mode. A multiple spatial stream mode may include single-user MIMO (SU-MIMO) operation, in which a single MIMO-capable information handling system is accessing an access point without the access point servicing other systems simultaneously. A single spatial stream mode for clients may include multi-user MIMO (MU-MIMO) operation, in which multiple MIMO-capable information handling systems are accessing an access point. When multiple systems are accessing an access point, the access point may not have sufficient spatial streams to provide multiple spatial streams to each of the systems. Thus, in MU-MIMO operation, the information handling systems may operate with less than their maximum number of spatial streams, and thus use less than all of an information handling system's available antennas.

The unused MIMO antennas may be re-used for transmitting information to other devices, such as through another wireless technology. When the information handling system is operating in SU-MIMO mode, all antennas may be used to direct spatial streams to the access point to improve throughput. When the information handling system is operating in MU-MIMO mode, fewer spatial streams may be directed to the access point, which frees one or more antenna. The unused antennas may be used for other communication sessions, such as to communicate with a different device. Communications with the different device may use a non-MIMO-enabled technology that uses a different wireless technology or a different spectrum than the MIMO system. In one example, an information handling system may communicate over 802.11 Wi-Fi in SU-MIMO mode using multiple spatial streams. When that information handling system switches to MU-MIMO mode, the reduction in spatial streams leaves an antenna unused. The available antenna may be used for a Bluetooth communication session. Reusing the antenna for multiple communications reduces size and cost of the information handling system by reducing the number of antennas required in the system. In 2017, about 20% of information handling systems support Wi-Fi MU-MIMO feature operating in the unlicensed 5 GHz frequency spectrum. This percentage is expected to reach to 50% in 2018, and close to 100% by 2020. These systems have unused antennas that may be re-used for transmitting information to devices other than the access point when the system's Wi-Fi radio operates in MU-MIMO mode and shares the access point with other MU-MIMO capable devices.

A communication session with another device may be initiated while the information handling system is operating in SU-MIMO mode. When no antennas are available, an antenna may be shared by the MIMO-enabled wireless technology and another wireless technology. Sharing the antenna may be performed through time division multiplexing. With time division multiplexing, the system allows one communication session to use the antenna for a first time period, followed by another communication session for a second time period. The system then switches the antenna back and forth between the first and second communication session rapidly. This time-sharing of the antenna may add extra latency due to switching the antenna between two radios for two different wireless technologies. Furthermore, this rapid switching between radios can also cause degradation on both radios' performance. The time-sharing technique can also be used to maintain the communication session with the other device when switching from MU-MIMO mode using one spatial stream to SU-MIMO mode using multiple spatial streams.

A method for communicating by an information handling system by reusing an antenna may include communicating according to a first wireless technology in a first spectrum through a first antenna and a second antenna in a multiple-input-multiple-output (MIMO) mode in the same spectrum. The system may detect multiple users sharing the first spectrum, and when multiple users are detected: communicating according to the first wireless technology in the first spectrum through the first antenna; and communicating according to a second wireless technology in a second spectrum through the second antenna simultaneously with communicating according to the first wireless technology in the first spectrum through the first antenna.

Another method for communicating by an information handling system by reusing an antenna may include communicating according to a first wireless technology in a first spectrum through a first antenna and a second antenna in a multiple-input-multiple-output (MIMO) mode by transmitting multiple spatial beams. The number of spatial streams used by the first wireless technology may change during operation due to conditions, such as the number of users operating in the first spectrum. When the number of spatial streams is less than the maximum supported by the information handling system, an antenna may be reused for another wireless technology. For example, an information handling system may have three Wi-Fi MIMO antennas. In a SU-MIMO mode, the Wi-Fi radio may use all three antennas. In a MU-MIMO mode, the Wi-Fi radio may use only one antenna. At least one of the unused two antennas may then be used for Bluetooth communications.

An information handling system configured to communicate by reusing an antenna may include a set of MIMO antennas include a first antenna configured to support a first spatial stream of a first wireless technology and a second antenna configured to support a second spatial stream of the first wireless technology. The system may include a controller for the first antenna and the second antenna. The controller may perform the method for communicating by reusing one of the antennas described above and/or perform other antenna control operations.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Figure 1:
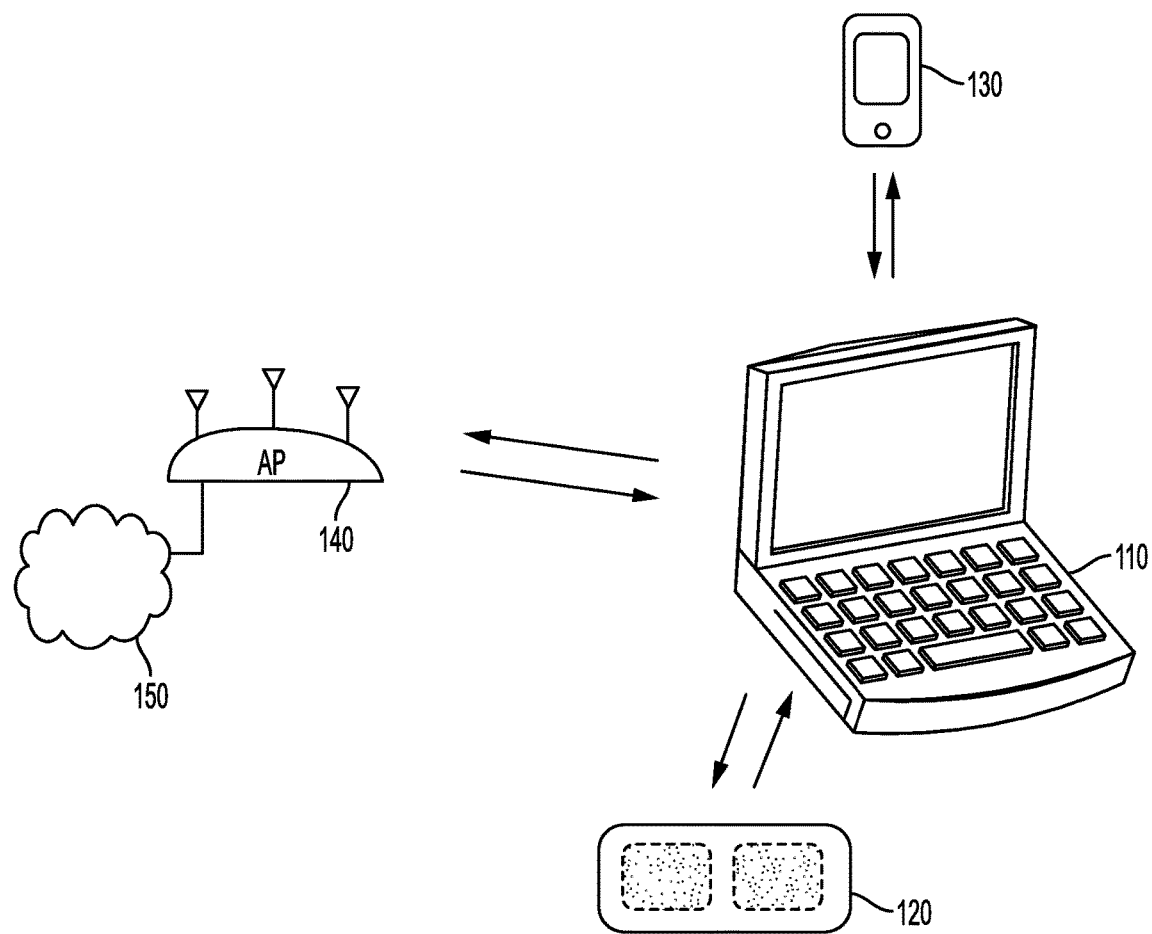
FIG. 1 is a diagram illustrating of information handling systems communicating according to the prior art.
Figure 2:
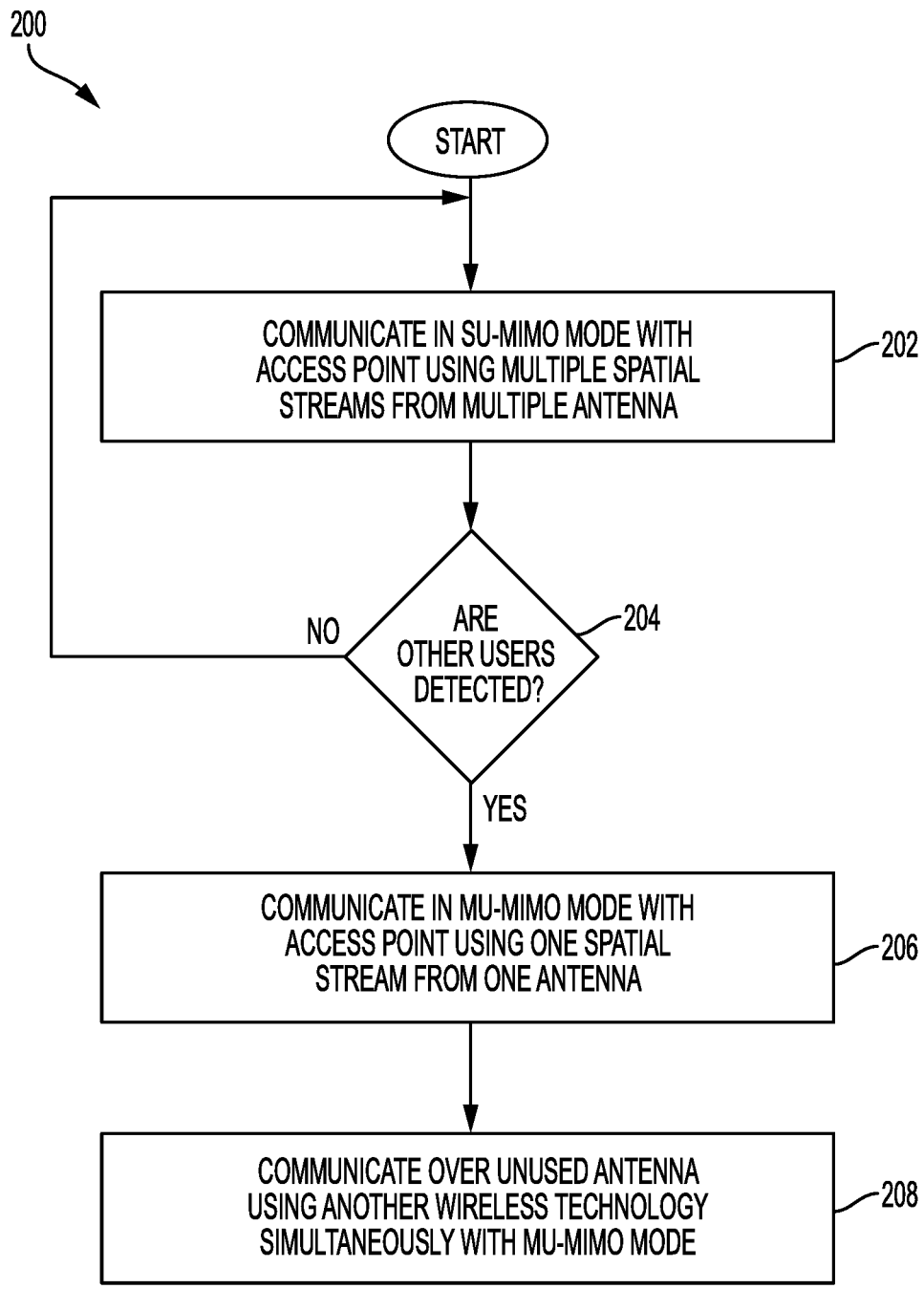
FIG. 2 is a flow chart illustrating an example method for reusing antennas of an information handling system for multiple wireless technologies according to some embodiments of the disclosure.

A set of MIMO antennas may be used by an information handling system to communicate information. A set of MIMO antennas may include a primary antenna supporting one spectrum and an auxiliary antenna support several spectrums. In one embodiment, a set of MIMO antennas for Wi-Fi may include a 5 GHz primary antenna and a 5/2.4 GHz auxiliary antenna. The set of MIMO antennas may be used simultaneous with Wi-Fi traffic supported on 5 GHz on the primary antenna and Bluetooth traffic supported on 2.4 GHz on the auxiliary antenna. The simultaneous operation may be possible when less than all of the MIMO system's spatial streams are in use, such as in a multi-user MIMO (MU-MIMO). In some embodiments, the primary antenna may also be a 5/2.4 GHz antenna. Simultaneous usage of the antennas eliminates latency introduced by switching between Wi-Fi and Bluetooth radios on one antenna and provides enhanced Wi-Fi and Bluetooth performance when connected to Bluetooth devices. FIG. 2 illustrates one example method of performing simultaneous operation of two wireless technologies using a set of MIMO antennas.

FIG. 2 is a flow chart illustrating an example method for reusing antennas of an information handling system for multiple wireless technologies according to some embodiments of the disclosure. A method 200 may begin at block 202 with communicating in single-user MIMO (SU-MIMO) mode with an access point using multiple spatial streams from multiple antennas. The SU-MIMO communications may be performed with a first MIMO-enabled wireless technology, such as in a Wi-Fi local area network (LAN) or a 4G or 5G cellular network. At block 204, the information handling system may determine if other users begin accessing the access point in the same spectrum using the same wireless technology. If no other users are detected, the information handling system may continue operation in SU-MIMO mode at block 202. When users are detected, or other conditions exists that inhibit operation of multiple spatial streams in SU-MIMO mode, the method 200 switches from SU-MIMO mode with multiple spatial streams to MU-MIMO mode with fewer or a single spatial stream.

When fewer spatial streams are used, simultaneous antenna sharing may allow reuse of antennas for other communications. At block 206, the information handling system communicates in MU-MIMO mode with an access point using one spatial stream from one antennas. With fewer than all spatial streams in use, some antennas are available for transmission of user data. Another wireless technology may use the antenna for communications with, e.g., local devices. The antenna may alternatively be reused for the same wireless technology but used for communication with another access point, information handling system, or electronic device. At block 208, the information handling system may communicate over the unused antenna using a different wireless technology, a different channel, a different spectrum, and/or a different recipient. The transmission through the unused antenna may be simultaneous with transmission in MU-MIMO mode through another antenna, such that an antenna is not shared between two different transmissions. In one example use, a music stream may be received through the first wireless technology and audio data output to a portable speaker through the second wireless technology.

Figure 3:
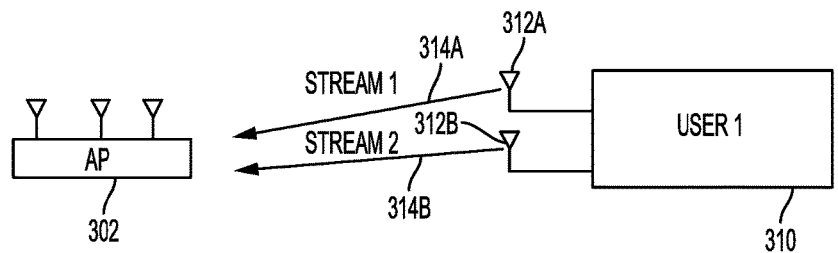
FIG. 3 is a diagram illustrating an information handling system communicating in single-user multiple-input-multiple-output (SU-MIMO) mode according to some embodiments of the disclosure.

The steps for the method of operation illustrated in FIG. 2 is illustrated in FIG. 3. FIG. 3 is a diagram illustrating an information handling system communicating in single-user multiple-input-multiple-output (SU-MIMO) mode according to some embodiments of the disclosure. A user device 310, such as an information handling system, may have a set of MIMO antennas 312A and 312B. In SU-MIMO mode of block 202 of FIG. 2, the user device 310 communicates through two or more spatial streams 314A and 314B through antennas 312A and 312N to the access point 302. The communication session of FIG. 3 illustrates an example SU-MIMO mode communications of block 202. When other users are detected, the user device 310 may switch to MU-MIMO mode communications. An example MU-MIMO mode communication session is shown in FIG. 4.

Figure 4:
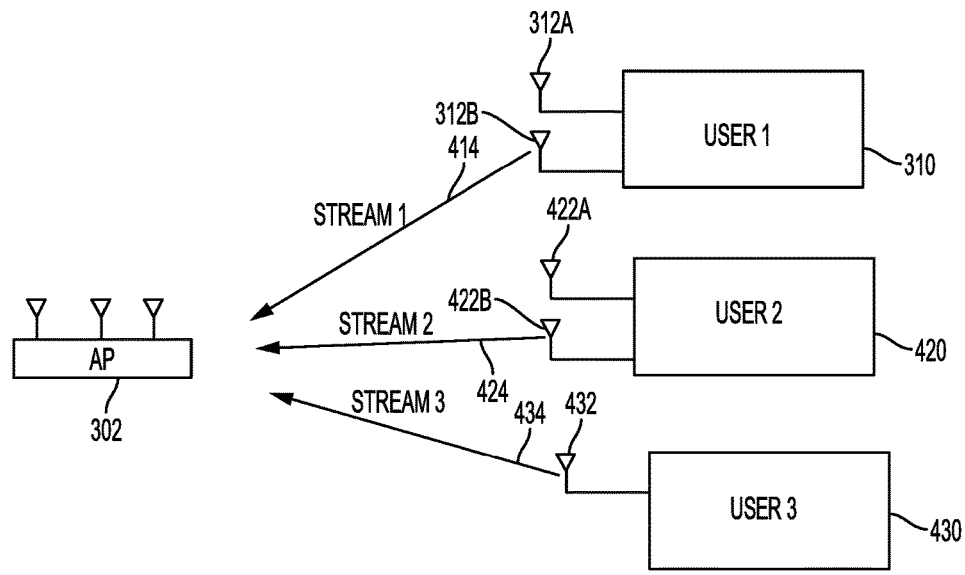
FIG. 4 is a diagram illustrating a network of information handling systems communicating in multiple-user multiple-input-multiple-output (MU-MIMO) mode according to some embodiments of the disclosure.

FIG. 4 is a diagram illustrating a network of information handling systems communicating in multiple-user multiple-input-multiple-output (MU-MIMO) mode according to some embodiments of the disclosure. A user device 310 may communicate with access point 302 through a single antenna 312B with spatial stream 414. Other user devices 420 and 430 may have the same or different MIMO configuration as user device 310. For example, user device 420 may include a set of MIMO antennas 422A and 422B. As another example, user device 430 may include a single antenna 432. The access point 302 may communicate spatial streams 414, 424, and 434 to a single antenna of each of the user devices 310, 420, and 430, respectively. The communication network of FIG. 4 is one example of MU-MIMO mode communications. In MU-MIMO, antennas 312B and 422B of user devices 310 and 420 remain unused.

Figure 5:
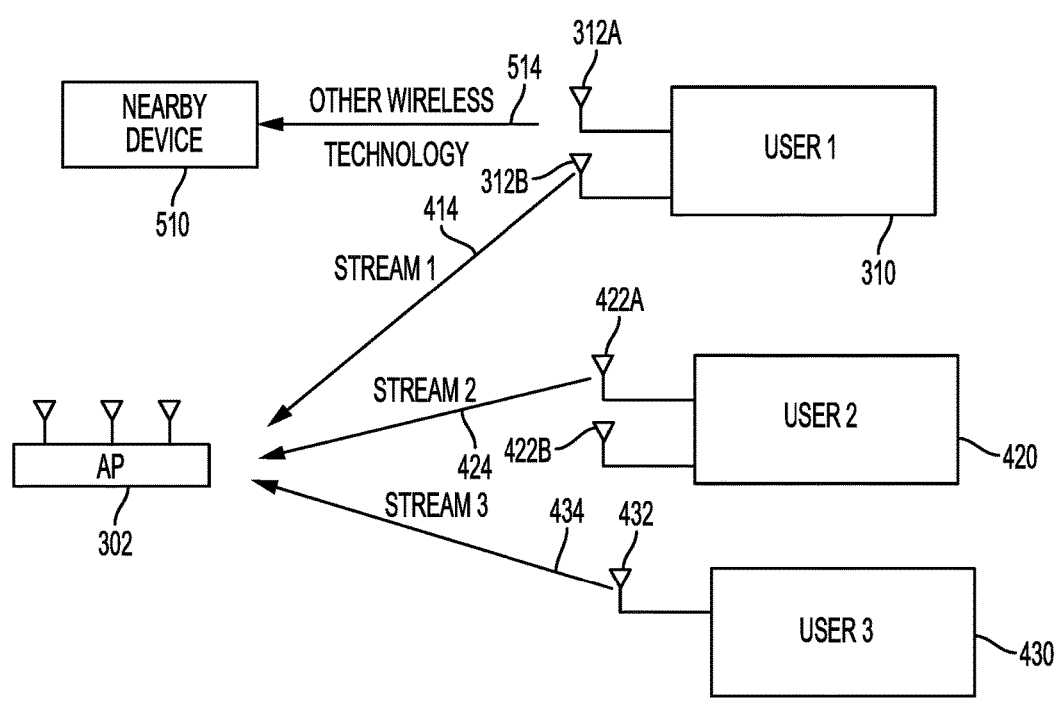
FIG. 5 is a diagram illustrating an information handling system reusing an antenna while in multiple-user multiple-input-multiple-output (MU-MIMO) mode according to some embodiments of the disclosure.

The unused antennas may be reused during communication sessions in accordance with some protocols of the embodiment. FIG. 5 is a diagram illustrating an information handling system reusing an antenna while in multiple-user multiple-input-multiple-output (MU-MIMO) mode according to some embodiments of the disclosure. The user device 310 communicates with access point 302 through spatial stream 414 and antenna 312B. Mobile devices 420 and 430 communicate with access point 302 through spatial streams 424 and 434, respectively, from antennas 422A and 432, respectively. The user device 310 may reuse antenna 312A, which is no longer communicating with access point 302, to communicate with nearby device 510 through communication session 514, which may be a different wireless technology than used for spatial streams 414, 424, and 434. The communication session 514 may be a different type of network, such as a personal area network (PAN) when spatial stream 414 is for a local area network (LAN). As other example, the wireless technology 514 may be a wide area network (WAN) when spatial stream 414 is a local area network (LAN), or the wireless technology 514 may be a local area network (LAN) when spatial stream 414 is a wide area network (WAN). The communication session 514 may also or alternatively be a different spectrum from spatial stream 414. For example, spatial stream 414 may be communicated through the unlicensed 2.4 GHz spectrum and communication session 514 communicated through the unlicensed 5 GHz spectrum, or vice versa.

An antenna for the communication session 514 is made possible by reuse of the MIMO antennas. When no MIMO antennas are available for reuse, such as during SU-MIMO communication illustrated in FIG. 3, a MIMO antenna may be time-shared between a MIMO spatial stream and another wireless technology. The time-sharing may allow the other communication session to continue when the MIMO antennas switch from MU-MIMO mode of FIG. 5 back to SU-MIMO mode of FIG. 3. Thus, a communication session starting during MU-MIMO mode may continue during SU-MIMO mode.

Figure 6:
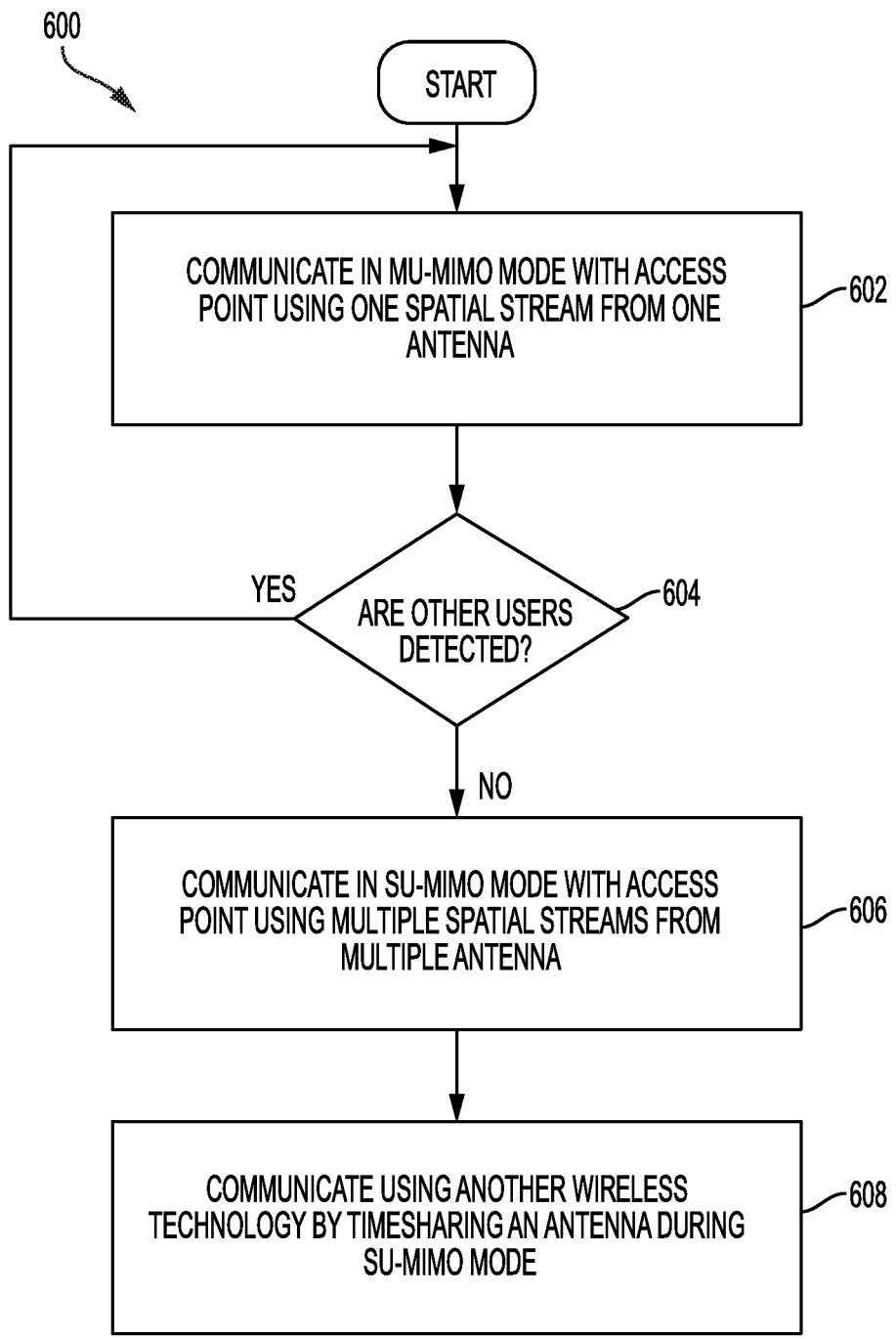
FIG. 6 is a flow chart illustrating an example method for time-sharing an antenna while communicating in single-user multiple-input-multiple-output (SU-MIMO) mode according to some embodiments of the disclosure.

FIG. 6 is a flow chart illustrating an example method for time-sharing an antenna while communicating in single-user multiple-input-multiple-output (SU-MIMO) mode according to some embodiments of the disclosure. A method 600 may begin at block 602 with communicating in MU-MIMO mode with an access point using one spatial stream from one antenna. Another communication session, such as through another wireless technology, may be initiated during MU-MIMO operation at block 602 and operate simultaneously with the MU-MIMO communication by reusing unused MIMO antennas. At block 604, the information handling system may determine if other users are communicating with the access point. If so, the system continues operating in MU-MIMO mode at block 602. If the other users disconnect, or conditions otherwise allow for additional spatial streams, the system may switch to communicating in SU-MIMO mode using multiple spatial streams to the access point at block 606. Initializing additional spatial streams at block 606 may require the unused antenna previously used for the other communication session. If so, that antenna may be time-shared at block 608 between the SU-MIMO communications and the other communication session, which may be through another wireless technology.

Figure 7:
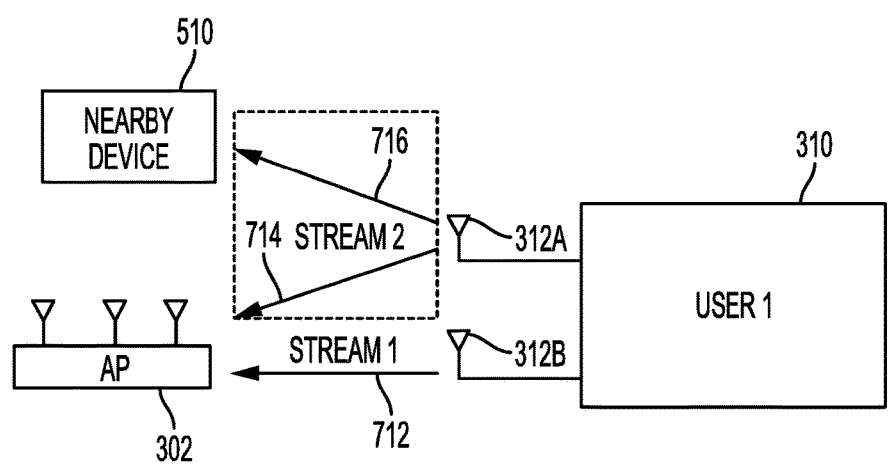
FIG. 7 is a diagram illustrating an information handling system time-sharing an antenna while communicating in single-user multiple-input-multiple-output (SU-MIMO) mode according to some embodiments of the disclosure.

An example of the time-sharing of a MIMO antenna during operation with multiple spatial streams is shown in FIG. 7. FIG. 7 is a diagram illustrating an information handling system time-sharing an antenna while communicating in single-user multiple-input-multiple-output (SU-MIMO) mode according to some embodiments of the disclosure. A user device 310 may communicate with access point 302 through a spatial stream 712 through antenna 312B. The user device 310 may transmit to access point 302 through spatial stream 714 through antenna 312A. The antenna 312A may be time-shared by also communicating communication session 716 to nearby device 510 from antenna 312A. During time-sharing, the communication session 716 transmits for a first time period, followed by the spatial stream 714 during a second time period, and then continuing to alternate between the communication session 716 and the spatial stream 714 for alternating time periods. The first and second time periods may be equal or unequal. When different wireless technologies are used for the spatial stream 714 and the communication session 716, a second wireless technology in a second spectrum may be transmitted through the second antenna while communicating in the single-user multiple-input-multiple-output (SU-MIMO) mode. For example, antenna 312A may be time-shared between Wi-Fi SU-MIMO communications and Bluetooth communications.

Figure 8:
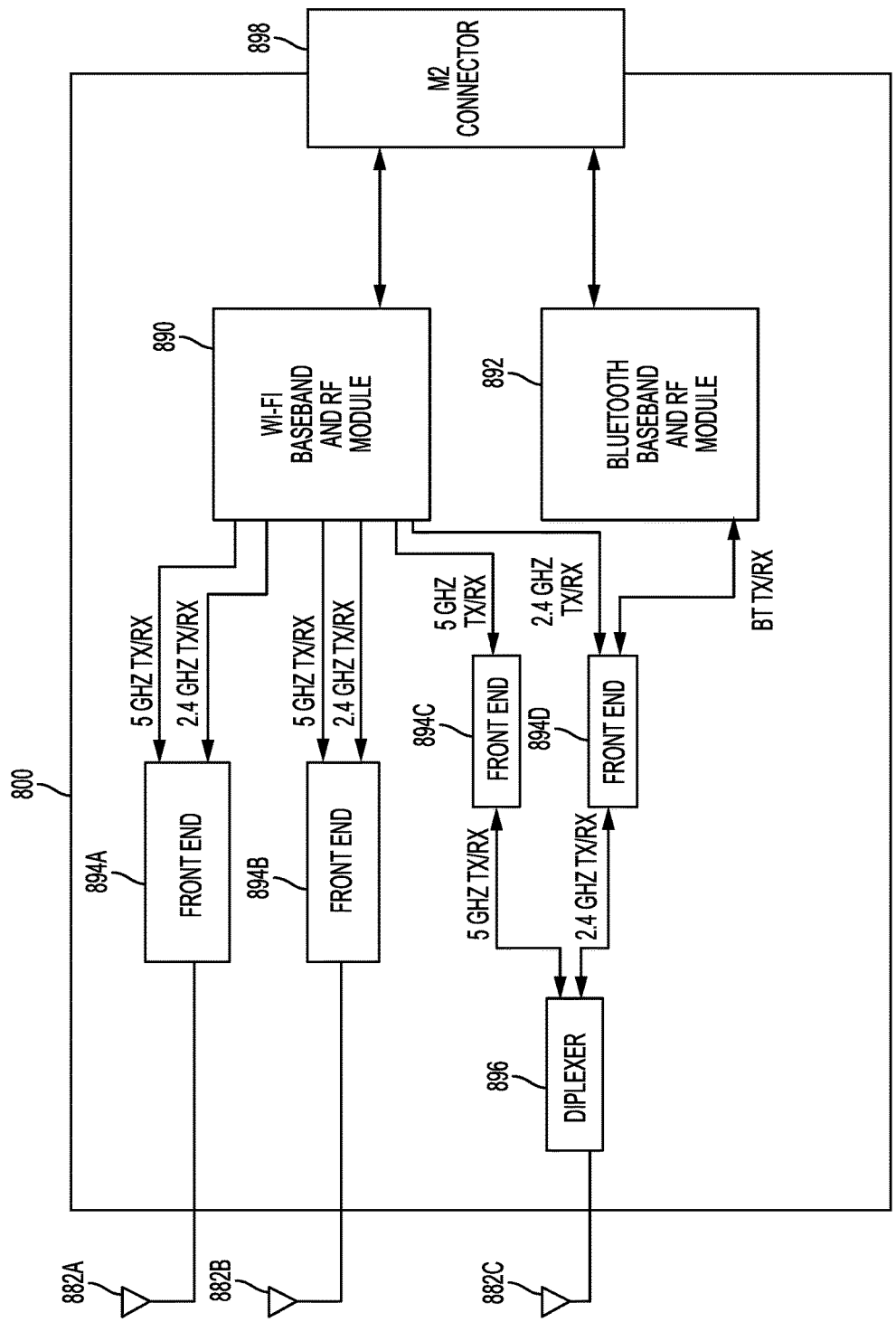
FIG. 8 is a block diagram illustrating a radio module for an information handling system according to some embodiments of the disclosure.

The operation of MIMO antennas and other communications functionality may be performed by a radio module of an information handling system. One example radio module is shown in FIG. 8. FIG. 8 is a block diagram illustrating a radio module for an information handling system according to some embodiments of the disclosure. A radio module 800 may be coupled to multiple MIMO antennas 882A, 882B, and 882C. Radio module 800 may include Wi-Fi (e.g., 802.11-based wireless local area network "WLAN") baseband processing device 890 and a separate Bluetooth (e.g., personal area network "PAN") baseband processing device 892. Although the radio module 800 of this embodiment includes two separate baseband processing devices, the disclosed systems and methods may be implemented with one baseband processing device coupled to multiple MIMO antennas or with more than two baseband processing devices that are together coupled to multiple MIMO antennas. Moreover, Wi-Fi and Bluetooth are exemplary RF communication technologies only, and that radio modules capable of any one or more RF communication technologies (including or other than Wi-Fi and Bluetooth) may be employed using the disclosed systems and methods.

Components of radio module 800 may be provided as an expansion card on a printed circuit board (PCB) with a suitable connector 898 (e.g., such as an M.2 edge connector) that provides interconnection via a mating edge connector for radio module 800 to a power supply and a communications bus to a platform controller hub (PCH) and/or a host processing device. In one embodiment, Wi-Fi processing device 890 may communicates with host processing device via a PCI Express (PCI-e) data bus and Bluetooth processing device 892 may communicate with host processing device via a universal serial bus (USB) data bus, although any other suitable data communication interface between radio modules and host processing devices may be used.

RF front ends may be used to interface the various wireless technologies to MIMO antennas. RF front ends 894A and 894B may be coupled between Wi-Fi processing device 890 and respective antennas 882A and 882B. RF front end 894C may be coupled between Wi-Fi processing device 890 and antenna 882C via diplexer 896. RF front end 894D may be coupled between antenna 882C and each of the Wi-Fi processing device 890 and Bluetooth processing device 892 via diplexer 896. Each of the RF front ends 894A, 894B exchange 2.4 GHz and 5 GHz Wi-Fi transmit and receive signals with Wi-Fi processing device 890. RF front end 894C may be configured to exchange 5 GHz Wi-Fi transmit and receive signals with Wi-Fi processing device 890. RF front end 894C may be configured to exchange 2.4 GHz Wi-Fi transmit and receive signals with Wi-Fi processing device 890, and to exchange 2.4 GHz Bluetooth transmit and receive signals with Bluetooth processing device 892. The diplexer 896 may also perform frequency domain multiplexing for 5 GHz Wi-Fi transmit and receive signals of RF front end 894C and 2.4 GHz Wi-Fi or Bluetooth transmit and receive signals of RF front end 894D as shown.

Each of the radio transceivers in processing devices 890 and 892 may be configured to perform intermediate frequency (IF) to RF up-conversion mixing, amplification and/or other RF processing tasks for outgoing signals to antennas 882A-C, and vice-versa (including down-conversion) for incoming signals from antennas 882A-C. Additionally, transceivers in processing devices 890 and 892 may perform up-conversion and down-conversion between RF and other suitable frequencies for processing by processing devices 890 and 892, e.g., such as zero-IF frequency, baseband frequency, etc. The processing devices 890 and 892 may a digital signal processor (DSP) or other processing devices. The processing devices 890 and 892 may each be coupled to exchange outgoing and incoming IF or other signals with front ends 894A-D through respective digital-to-analog (DAC) and analog-to-digital (ADC) converters (not shown). Baseband processing devices 890 and 892 may be configured to manage RF signal transmission and reception, as well as to perform tasks including signal processing, encoding, frequency shifting, and/or modulation operations to provide information in outgoing signals based on digital data provided by a host processing device, and to perform signal processing, decoding, frequency shifting, and/or demodulation operations to obtain the message content in incoming signals as digital data to provide to a host processing device. Each front end component 894A-D may perform transmit and receive functionality with an integrated low noise amplifier to amplify attenuated receive signals and a power amplifier to amplify transmit signals to facilitate MIMO functionality and performance.

An unused antenna may be reused for other communication session by controlling the radio module to operate the MIMO antennas. In SU-MIMO mode communications, the Wi-Fi processing module 890 may control transmission through MIMO antennas 882A, 882B, and 882C to provide multiple spatial streams to an access point. In MU-MIMO mode communications, the Wi-Fi processing module 890 may control transmission through MIMO antenna 882A and/or 882B. MIMO antenna 882C may be unused during MU-MIMO mode. The diplexer 896 may allow Bluetooth processing module 892 to transmit through MIMO antenna 882C to reuse MIMO antenna 882C.

Figure 9:
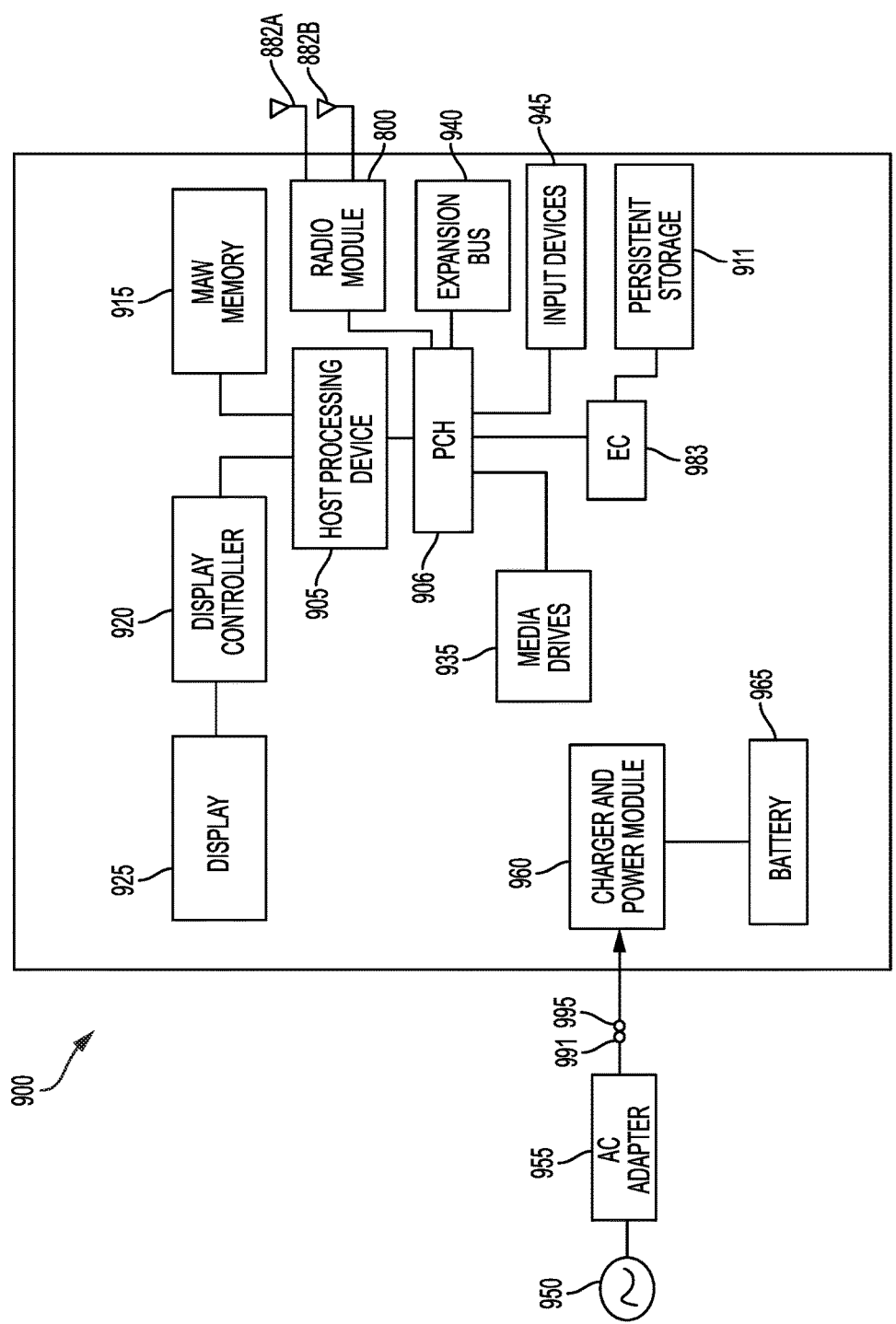
FIG. 9 is a block diagram illustrating an information handling system according to some embodiments of the disclosure.

The radio module 800 may be incorporated into an information handling system, such as a laptop computer, tablet computer, or mobile phone. One example configuration for an information handling system is shown in FIG. 9. FIG. 9 is a block diagram illustrating an information handling system according to some embodiments of the disclosure.

An information handling system 900 may be a mobile portable information handling system such as notebook computer, MP3 player, personal data assistant (PDA), cell phone, smart phone, cordless phone, tablet computer, etc. Information handling system 900 may include a host processing device 905, such as an x86 processor, ARM processor, IA-64 processor, or other processor. The host processing device 905 may be coupled together with a platform controller hub (PCH) 906 for some applications. Host processing device 905 may be configured to execute an operating system (OS), such as a Windows-based operating system, Linux-based operating system, or others. System memory 915 (e.g., DRAM) and a display controller 920 may be coupled to host processing device 905. The display controller 920 may operate a display device 925 (e.g., a liquid crystal display (LCD)) to provide visual images (e.g., a graphical user interface, a document, and/or a three-dimensional image) to the user. The display controller 920 may be coupled to a display 925 internal to the system 900 through embedded Display Port (eDP) components such as an eDP cable and an eDP connector. The display controller 920 may also or alternatively be coupled to an external display (not shown) through DP, HDMI, VGA, USB, or other cables. Media drives 935 may be coupled to host processing device 905 via PCH 906 to provide permanent storage for the information handling system 900.

An expansion bus 940 may be coupled to PCH 906 to provide the information handling system 900 with additional plug-in functionality. Expansion bus 940 may be a PCI bus, PCI Express bus, SATA bus, USB or any other expansion bus. Input devices 945, such as a keyboard and mouse, may be coupled via PCH 906 to host processing device 905 to enable the user to interact with the information handling system 900. A radio module 800 may be coupled to host processing device 905 via PCH 906, and multiple MIMO antennas 882A, 882B may in turn be coupled to radio module 800. An embedded controller (EC) 980 may also be coupled to PCH 906 and may be configured to perform various tasks such as battery and power management, I/O control, etc. Persistent storage 911 (e.g., embedded and partitioned flash memory, Electrically Erasable Programmable Read Only Memory—EEPROM, etc.) may be coupled to EC 980 for storing persistent information for EC 980. The radio module 800 may be implemented as an installable (e.g., interchangeable) module, or may be provided to have any other suitable configuration, e.g., as any suitable combination of radio processing device and transceiver components that are either permanently or interchangeably coupled in an operative manner to other components of system 900.

The information handling system 900 may be coupled to an external source of power, such as AC mains 950 through AC adapter 955. External power may be alternatively provided from any other suitable external source (e.g., external DC power source) or that AC adapter 955 may alternatively be integrated within an information handling system 900 such that AC mains 950 supplies AC power directly to information handling system 900. AC adapter 955 may be removably coupled to, and separable from, power module 960 at mating interconnection terminals 991 and 995 in order to provide a source of DC power to supplement DC power provided by battery cells of a battery system 965, which may be a lithium ion ("Li-ion") or nickel metal hydride ("NiMH") battery pack including one or more rechargeable batteries and a BMU that includes an analog front end ("AFE") and microcontroller. Power module 960 may also provide DC power for recharging battery cells of the battery system 965 during charging operations.

The schematic flow chart diagrams of FIG. 2 and FIG. 6 are generally set forth as a logical flow chart diagram. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The operations described above may be performed by any circuit configured to perform the described operations. Such a circuit may be an integrated circuit (IC) constructed on a semiconductor substrate and include logic circuitry, such as transistors configured as logic gates, and memory circuitry, such as transistors and capacitors configured as dynamic random access memory (DRAM), electronically programmable read-only memory (EPROM), or other memory devices. The logic circuitry may be configured through hard-wire connections or through programming by instructions contained in firmware. Further, the logic circuitry may be configured as a general purpose processor capable of executing instructions contained in software. In some embodiments, the operations may be performed by the host processing device 905, the embedded controller 983, the processing modules 890 and 892 of the radio module 800, and/or another controller on the radio module 800 or in the information handling system 900 not shown in FIG. 8 or FIG. 9.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. For example, although processors are described throughout the detailed description, aspects of the invention may be implemented on different kinds of processors, such as graphics processing units (GPUs), central processing units (CPUs), and digital signal processors (DSPs). As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

What is claimed is:

1. A method, comprising:
    communicating according to a first wireless technology in a first spectrum through a first antenna and a second antenna in a multiple-input-multiple-output (MIMO) mode;
    detecting multiple users sharing the first spectrum; and
    when multiple users are detected in the first spectrum:
        communicating according to the first wireless technology in the first spectrum through the first antenna; and
        communicating according to a second wireless technology in a second spectrum through the second antenna simultaneously with communicating according to the first wireless technology in the first spectrum through the first antenna.

2. The method of claim 1, wherein communicating according to the first wireless technology comprises communicating on a local area network (LAN), and wherein communicating according to the second wireless technology comprises communicating on a personal area network (PAN).

3. The method of claim 1, wherein communicating according to the first wireless technology comprises communicating on a Wi-Fi network, and wherein communicating according to the second wireless technology comprises communicating on a Bluetooth network.

4. The method of claim 1, wherein the step of communicating according to the first wireless technology in the first spectrum through the first antenna when multiple users are detected in the first spectrum comprises communicating in a multi-user multiple-input-multiple-output (MU-MIMO) mode.

5. The method of claim 1, further comprising:
    detecting the multiple users are no longer sharing the first spectrum; and
    when a single user is detected in the first spectrum, communicating in a single-user multiple-input-multiple-output (SU-MIMO) mode by:
        communicating a first spatial stream according to the first wireless technology in the first spectrum through the first antenna; and
        communicating a second spatial stream according to the first wireless technology in the first spectrum through the second antenna.

6. The method of claim 1, further comprising time-sharing the second antenna by communicating according to the second wireless technology in the second spectrum through the second antenna while communicating in the single-user multiple-input-multiple-output (SU-MIMO) mode.

7. An information handling system, comprising:
    a first antenna configured to support a first spatial stream of a first wireless technology;
    a second antenna configured to support a second spatial stream of the first wireless technology; and
    a controller coupled to the first antenna and the second antenna, wherein the controller is configured to perform steps comprising:
        communicating according to the first wireless technology in a first spectrum through the first antenna and the second antenna in a multiple-input-multiple-output (MIMO) mode;
    detecting multiple users sharing the first spectrum; and
    when multiple users are detected in the first spectrum:
        communicating according to the first wireless technology in the first spectrum through the first antenna; and
        communicating according to a second wireless technology in a second spectrum through the second antenna simultaneously with communicating according to the first wireless technology in the first spectrum through the first antenna.

8. The information handling system of claim 7, wherein communicating according to the first wireless technology comprises communicating on a local area network (LAN), and wherein communicating according to the second wireless technology comprises communicating on a personal area network (PAN).

9. The information handling system of claim 7, wherein communicating according to the first wireless technology comprises communicating on a Wi-Fi network, and wherein communicating according to the second wireless technology comprises communicating on a Bluetooth network.

10. The information handling system of claim 7, wherein the step of communicating according to the first wireless technology in the first spectrum through the first antenna when multiple users are detected in the first spectrum comprises communicating in a multi-user multiple-input-multiple-output (MU-MIMO) mode.

11. The information handling system of claim 7, wherein communicating through the first antenna comprises communicating a music stream from a remote server according to the first wireless technology, and wherein communicating through the second antenna comprises communicating audio signals for output through a speaker according to the second wireless technology.

12. The information handling system of claim 7, wherein the controller is further configured to perform steps comprising:
    detecting the multiple users are no longer sharing the first spectrum; and
    when a single user is detected in the first spectrum, communicating in a single-user multiple-input-multiple-output (SU-MIMO) mode by:
        communicating a first spatial stream according to the first wireless technology in the first spectrum through the first antenna; and
        communicating a second spatial stream according to the first wireless technology in the first spectrum through the second antenna.

13. The information handling system of claim 12, wherein the controller is further configured to perform steps comprising time-sharing the second antenna by communicating according to the second wireless technology in the second spectrum through the second antenna while communicating in the single-user multiple-input-multiple-output (SU-MIMO) mode.

14. An apparatus, comprising:
    a controller configured to perform steps comprising:
        communicating according to a first wireless technology in a first spectrum through a first antenna and a second antenna in a multiple-input-multiple-output (MIMO) mode;
        detecting multiple users sharing the first spectrum; and
        when multiple users are detected in the first spectrum:
            communicating according to the first wireless technology in the first spectrum through the first antenna; and
            communicating according to a second wireless technology in a second spectrum through the second antenna simultaneously with communicating according to the first wireless technology in the first spectrum through the first antenna.

15. The apparatus of claim 14, wherein communicating according to the first wireless technology comprises communicating on a local area network (LAN), and wherein communicating according to the second wireless technology comprises communicating on a personal area network (PAN).

16. The apparatus of claim 14, wherein communicating according to the first wireless technology comprises communicating on a Wi-Fi network, and wherein communicating according to the second wireless technology comprises communicating on a Bluetooth network.

17. The apparatus of claim 14, wherein the controller is further configured to perform steps comprising:
    detecting the multiple users are no longer sharing the first spectrum; and
    when a single user is detected in the first spectrum, communicating in a single-user multiple-input-multiple-output (SU-MIMO) mode by:
        communicating a first spatial stream according to the first wireless technology in the first spectrum through the first antenna; and
        communicating a second spatial stream according to the first wireless technology in the first spectrum through the second antenna.

18. The apparatus of claim 17, wherein the controller is further configured to perform steps comprising time-sharing the second antenna by communicating according to the second wireless technology in the second spectrum through the second antenna while communicating in the single-user multiple-input-multiple-output (SU-MIMO) mode.

19. The apparatus of claim 14, further comprising a radio module coupled to the controller, the radio module comprising;
    a plurality of MIMO antennas;
    a first processing device configured to perform baseband operations according to the first wireless technology, wherein the first processing device is a Wi-Fi processing device;
    a second processing device configured to perform baseband operations according to the second wireless technology, wherein the second processing device is a Bluetooth processing device; and
    a radio frequency (RF) front end coupled to the plurality of MIMO antennas and between the plurality of MIMO antennas and the first processing device and the second processing device, wherein the RF front end is configured to:
        couple the first processing device to one of the plurality of MIMO antennas in a single-user multiple-input-multiple-output (SU-MIMO) mode; and
        couple the second processing device to the one of the plurality of MIMO antennas in a multi-user multiple-input-multiple-output (MU-MIMO) mode.

20. The apparatus of claim 19, wherein the controller is integrated in the radio module.

* * * * *